United States Patent Office 3,542,802
Patented Nov. 24, 1970

3,542,802
3-(N - BENZYLTHIOCARBAMOYLTHIOMETHYL)-6, 7-DIHYDRO - 5H - IMIDAZO[2,1-b]THIAZOLIUM CHLORIDE AND CONGENERS
Robert C. Tweit, Wilmette, Ill., assignor to G. D. Searle & Co., Chicago, Ill., a corporation of Delaware
No Drawing. Filed July 3, 1968, Ser. No. 742,166
Int. Cl. C07d 91/42
U.S. Cl. 260—306.8        10 Claims

ABSTRACT OF THE DISCLOSURE

Preparation of anti-inflammatory, anti-microbial, anthelmintic, and anti-germinant 3-{N-[(phenyl/furyl)alkyl]thiocarbamoylthiomethyl} - 7H - imidazo[2,1-b]thiazolium chlorides optionally substituted in the benzene ring by alkyl, halogen, and/or alkoxy and in the imidazo ring by alkyl, and which can be 5,6-dihydrogenated, is disclosed.

---

This invention relates to 3-(N-benzylthiocarbamoylthiomethyl)-6,7-dihydro-5H-imidazo[2,1-b]thiazolium chloride and congeners, and to processes for the preparation thereof. More particularly, this invention provides new, useful, and unobvious chemical compounds of the formula

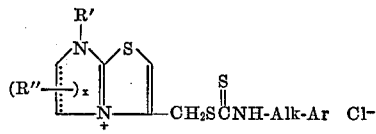

wherein the dotted line represents optional $\Delta^5$ unsaturation, R' and R'' each represent hydrogen or alkyl, $x$ represents 0 or a positive integer less than 5, Alk represents alkylene, and Ar represents phenyl optionally substituted by 1 or more alkyls, halogens, and/or alkoxys. Alternatively, Ar represents furyl.

The alkyls called for can be alike or different (including those represented by R''), and are preferably of lower order, i.e., embracive of fewer than 8 carbon atoms.

Illustrative of such lower alkyl radicals are methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of empirical formula

wherein $a$ represents a positive integer less than 8. Those skilled in the art will recognize that when $x$ in the first formula above represents 0, no R'' substituents are present, nor can more than 2 R'' substituents be present when carbon atoms 5 and 6 of the enformulated compounds are doubly bonded.

The halogens called for can be fluorine, chlorine, bromine, and/or iodine, albeit the first 3 are preferred; and the alkoxys, like the alkyls, are preferably of lower order, i.e., described by the expression —O-lower alkyl in which the lower alkyl constituent is defined as before. Although as many as 5 alkyls, halogens, and/or alkoxys can be present in the benzene ring of the instant compounds, fewer than 4—including none at all—is commonly advantageous.

Among the alkylenes represented by Alk in the first formula hereof, those containing fewer than 6 carbon atoms are preferred. Illustrative of such groupings are methylene, ethylene, trimethylene, propylene, tetramethylene, 1,1-dimethylethylene, pentamethylene, 2,2-dimethyltrimethylene, and like bivalent, acyclic, straight- or branched-chain, hydrocarbon groupings of empirical formula

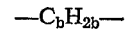

wherein $b$ represents a positive integer less than 6.

The compounds to which this invention relates are useful by reason of their valuable biological properties. Thus, for example, they are anti-inflammatory, anti-bacterial, anti-algal, anti-fungal, anti-germinant, anti-protozoal, and anthelmintic.

The anti-inflammatory utility of the instant compounds is evident from the results of a standardized test for the capacity to inhibit the edema induced in rats by injection of carrageenin. The procedure is a modification of one described by Winter et al., Proc. Soc. Exp. Biol. and Med., 111, 544 (1962). Compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the 2 hind feet in the group treated therewith, which is measured in arbitrary units 5 hrs. after the carrageenin injection, is significantly ($P \leq 0.05$) less than the corresponding value (C) for the control group. Results of testing by this procedure the representative products of examples 1, 11, 13B, and 16 hereinafter are shown in Table I.

TABLE I

| Product: | Dose (mg.) | Route | C | T | C—T | Conclusion |
|---|---|---|---|---|---|---|
| 1 | 25 | Subcutaneously | 101.9 | 87.5 | 14.4 | Anti-inflammatory. |
| 11 | 25 | do | 102.0 | 99.1 | 2.9 | Do. |
| 13B | 25 | do | 102.1 | 87.1 | 15.0 | Do. |
| 16 | 25 | do | 113.1 | 108.5 | 4.6 | Do. |

The anti-bacterial and anti-algal utility of the instant compounds is evident from the results of standardized tests whereby sterile blood and Bristol agar plates are inoculated with *Diplococcus pneumoniae* and *Chlorella vulgaris*, respectively; approximately 5 mg. of compound is placed on the surface of each plate so as to cover a circle approximately 4 mm. in diameter; and the plates are thereupon incubated in accordance with the schedule in Table II.

TABLE II

| Organism | Time | Temp., degrees | Artificial light |
|---|---|---|---|
| D. pneumoniae | 24 hrs | 36 | No. |
| C. vulgaris | 5–7 days | 25 | Yes. |

Copper sulfate serves as reference standard in the latter test. Clear zones of inhibition signify the utility in question.

The anti-fungal utility of the instant compounds is evident from the results of standardized tests whereby sterile Mycophil agar plates are inoculated with *Trichophyton*

*mentagrophytes* or *Candida albicans;* approximately 5 mg. of compound is placed on the surface of each plate so as to cover a circle approximately 4 mm. in diameter; and the plates are incubated for 96 hrs. at 25°. Undecylenic acid and nystatin serve as reference standards. Clear zones of inhibition signify the utility in question.

The anti-germinant activity of the instant compounds is evident from the results of a standardized test whereby three 42.5-mm. (diameter) filter paper discs are stacked in each of two 60-mm. Petri dishes, each stack is moistened with 2 ml. of distilled water, 10 white clover (*Trifolium repens*—a representative dicotyledon) seeds are arranged atop each stack at approximately equal intervals around the periphery, approximately 5 mg. of the compound is placed in the center of one seed circle (the other serves as control), the dishes are covered with glass lids and then incubated at room temperatures for 10 days, and germination in the control dish is thereupon compared with that in the dish containing seeds exposed to test compound.

The anti-protozoal utility of the instant compounds is evident from the results of a standardized test for their capacity to inhibit the growth of *Tetrahymena gelleii*. In this test, a nutrient broth consisting of 12 gm. of proteose peptone, 8 gm. of sucrose, and 1000 ml. of water is sterilized, inoculated with an axenic culture of the test organisms, and incubated at approximately 25° for 24 hrs. whereupon 0.5 ml. quantities are aseptically transferred to each of 2 test tubes, one of which contains approximately 5 mg. of compound. After a second 24-hr. incubation at approximately 25°, growths of the organism are compared by microscopic examination.

Further evidence of the anti-protozoal utility of the instant compounds is provided by standardized tests for their capacity to inhibit the growth of *Tritrichomonas foetus* and *Trichomonas vaginalis,* conducted as follows: To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water; adjusting the pH to 6.8 with 4% sodium hydroxide; incorporating 30 parts of agar (Baltimore Biological Laboratories); boiling for 1 minute to dissolve the agar; and sterilizing in an autoclave, is aseptically added 20 volumes of sterile Dubos medium serum. The resultant medium is inoculated with 1% (by volume) of either a 48-hr. or a 72-hr. culture of *T. foetus* or *T. vaginalis,* whereupon 1 ml. of the inoculated medium is mixed with 10 mg. of test compound. The mixture is incubated anaerobically at 37° for 48 hrs. and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 mcgm. of test compound per ml., and the resultant mixtures are inoculated anaerobically as before at 37° for 48 hrs. and then examined microscopically for the presence of motile trichomonads. Controls are provided by concurrent incubations identical with the foregoing except for the absence of test compound.

The anthelmintic utility of the instant compounds is evident from the results of a standardized test for their capacity to immobilize *Turbatrix aceti,* a representative nematode. In this test, a washed suspension of *Turbatrix aceti* containing approximately 2000 nematodes per ml. is prepared in distilled water, whereupon 1 ml. of the suspension is mixed with 10 mg. of test compound. The mixture is incubated at room temperatures for 48 hrs. and then examined grossly for the presence of motile worms. If any are observed, the compound is considered inactive. If no motile worms are observed, 0.1 ml. of the incubated mixture is serially diluted and mixed with a freshly-prepared suspension of the nematode to produce concentrations of 1000, 100, 10 and 1 mcgm. of test compound per ml.; and the resultant mixtures are incubated as before at room temperatures for 48 hrs. and then examined grossly for the presence of motile worms. Controls are provided by concurrent incubations identical with the foregoing except for the absence of test compound.

Those skilled in the art will recognize that observations of activity in standardized tests for particular biological effects are fundamental to the developments of valuable new drugs, both veterinary and human. Distinct from such applications, anti-algal compounds are adapted to the conditioning of boiler feedwater and the like, whereas anti-germinant compounds serve as herbicides.

Preparation of the instant compounds proceeds by contacting 1,3-dichloro-2-propane in alcohol solution with a triethylammonium dithiocarbamate of the formula

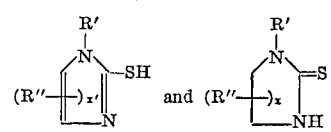

and heating the resultant 1-aralkylthiocarbamoylthio-3-chloro-2-propanone in situ with an imidazole-2-thiol or 2-imidazolidinethione of the formulas

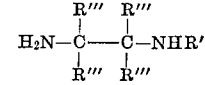

respectively, Ar, Alk, R', R'', and x in the latter 3 formulas having the meanings previously assigned and x' representing 0 or a positive integer less than 3. Where the appropriate 2-imidazolidinethione is not otherwise available, it can be prepared by heating an alkylenediamine of the formula $$H_2N-\underset{R'''}{\overset{R'''}{C}}-\underset{R'''}{\overset{R'''}{C}}-NHR'$$

wherein R' has the meaning previously assigned and each R''' represents hydrogen or R'' as hereinbefore defined, alike or different, with carbon disulfied in aqueous ethanol. Such of the dithiocarbamate salts as are not otherwise available can be prepared by contacting an amine of the formul
the formula Z-Alk-NH$_2$ amine and a solution of carbon disulfide in ether.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

3-(N-benzylthiocarbamoylthiomethyl)-6,7-dihydro-5H-imidazo[2,1-b]thiazolium chloride.—Approximately 143 parts of triethylammonium benzyldithiocarbamate is dissolved in a solution of 64 parts of 1,3-dichloro-2-propanone in 400 parts of methanol. Approximately 51 parts of 2-imidazolidinethione is added ½ hour later, and the resultant mixture is heated at approximately 90° until solution occurs. Solvent is thereupon distilled off, and the precipitate which eventuates is filtered off and washed by trituration with hot methanol. The material thus isolated is 3-(N-benzylthiocarbamoylthiomethyl)-6,7-dihydro-5H- imidazo[2,1-b]thiazolium chloride melting at 219–221° (dec.). The product has the formula

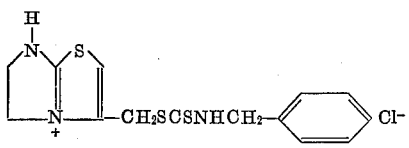

EXAMPLE 2

(A) Triethylammonium 3 - phenylpropyldithiocarbamate.—To a mixture of 135 parts of 3-phenylpropylamine, 101 parts of triethylamine, and 710 parts of ether at 5–10° is slowly added a solution of 102 parts of carbon disulfide in 70 parts of ether. The solid which forms is triethylammonium 3-phenylpropyldithiocarbamate melting in the range 68–100°.

(B) 6,7-dihydro-3-[N-(3-phenylpropyl)thiocarbamoylthiomethyl]-5H-imidazo[2,1-b]thiazolium chloride.—To a solution of 41 parts of 1,3-dichloro-2-propanone in 400 parts of methanol is slowly added 101 parts of triethylammonium 3-phenylpropyldithiocarbamate. The resultant mixture is allowed to stand overnight, whereupon 33 parts of 2-imidazolidinethione is introduced. Approximately ½ of the methanol present is thereupon removed by distillation. From the distill and, on cooling, 6,7-dihydro-3-[N-(3-phenylpropyl)thiocarbamoylthiomethyl] - 5H-imidazo[2,1-b]thiazolium chloride melting at 212–214° (dec.). precipitates. The product, which is isolated by filtration and dried in air, has the formula

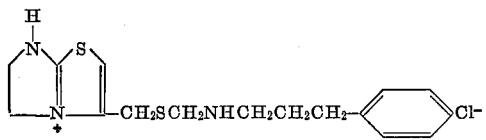

EXAMPLE 3

3-(N - benzylthiocarbamoylthiomethyl) - 6,7 - dihydro-7-methyl-5H-imidazo[2,1-b]thiazolium chloride.—To a solution of 64 parts of 1,3-dichloro-2-propanone in 400 parts of methanol is slowly added 143 parts of triethylammonium benzyldithiocarbamate. Approximately ½ hour later, 58 parts of 1-methyl-2-imidazolidinethione is introduced. The restulant mixture is heated at around 90° until solution occurs, whereupon the solution is cooled and then diluted with sufficient ether to precipitate triethylamine hydrochloride. The precipitate is filtered out, and the filtrate is stripped of solvent by distillation. The residue is 3-(N-benzylthiocarbamoylthiomethyl)-6,7-dihydro-7-methyl - 5H - imidazo[2,1-b]thiazolium chloride, having the formula

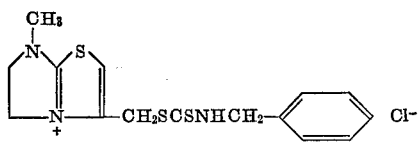

EXAMPLE 4

(A) 4-methyl-2-imidazolidinethione.—A mixture of 134 parts of 1,2-propanediamine, 240 parts of ethanol, and 300 parts of water is heated at around 45° under reflux while 145 parts of carbon disulfide is slowly introduced. The resultant solution is heated at the boiling point under reflux for 1½ hours, at which point 18 parts of concentrated hydrochloric acid is introduced and boiling thereupon resumed for 3 days. Solvent is then removed by vacuum distillation, and the solid residue is recrystallized from benzene to give 4-methyl-2-imidazolidinethione melting at 96–100°.

(B) 3 - (N - benzylthiocarbamoylthiomethyl) - 6,7-dihydro-6-methyl-5H-imidazo[2,1-b]thiazolium chloride.—To a solution of 64 parts of 1,3-dichloro-2-propanone in 400 parts of methanol, is slowly added 143 parts of triethylammonium benzyldithiocarbamate. Approximately ½ hour later, 58 parts of 4-methyl-2-imidazolidinethione is introduced. The resultant mixture is heated at 90° to effect solution. The solution is cooled and diluted with sufficient ether to precipitate triethylamine hydrochloride. The precipitate is filtered out, and the filtrate is distilled to the point of incipient precipitation and then chilled. The precipitate is filtered off and crystallized from 2-propanol to give 3-(N-benzylthiocarbamoylthiomethyl)-6,7-dihydro-6 - methyl - 5H - imidazo[2,1-b]-thiazolium chloride melting at 151–154°. The product has the formula

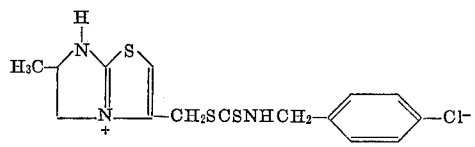

EXAMPLE 5

(A) 1 - isopropyl - 4,4 - dimethyl - 2 - imidazolidinethione.—To a solution of 65 parts of N'-isopropyl-2-methyl-1,2-propanediamine in 65 parts of absolute ethanol and 80 parts of water at approximately 45° under reflux is slowly added 40 parts of carbon disulfide. Toward the end of the addition, precipitation occurs. The resultant mixture is heated at the boiling point under reflux for 1 hour, at which point 6 parts of concentrated hydrochloric acid is introduced and boiling thereupon resumed for 2 days. The reaction mixture is then chilled, and insoluble solids are separated therefrom by filtration and dried in air. The product thus isolated is 1-isopropyl-4,4-dimethyl-2-imidazolidinethione melting at 182–185°.

(B) 3-(N - benzylthiocarbamoylthiomethyl) - 6,7 - dihydro-7-isopropyl-5,5-dimethyl-5H - imidazo[2,1 - b]thiazolium chloride.—To a solution of 64 parts of 1,3-dichloro-2-propanone in 400 parts of methanol is slowly added 143 parts of triethylammonium benzyldithiocarbamate, followed ½ hour later by 86 parts of 1-isopropyl-4,4-dimethyl - 2 - imidazolidinethione. The resultant mixture is warmed until solution occurs, whereupon it is distilled to ½ volume and then diluted with sufficient acetone to precipitate triethylamine hydrochloride. The precipitate is filtered out, and the filtrate is distilled to ½ volume and then diluted with an equal volume of acetone. The pricipitate thrown down is 3-(N-benylthiocarbamoylthiomethyl) - 6,7 - dihydro - 7 - isopropyl - 5,5 - dimethyl - 5H - imidazo[2,1 - b]thiazolium chloride which, recrystallized from a mixture of methanol and 2-propanol, melts at 188–190.5°. The product has the formula

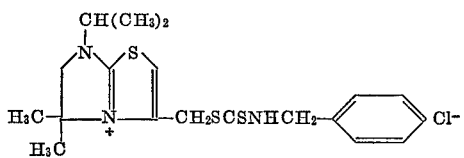

EXAMPLE 6

(A) Triethylammonium o - methylbenzyldithiocarbamate.—Substitution of 121 parts of o-methylbenzylamine for the 3-phenylpropylamine called for in Example 2A affords, by the procedure there detailed, triethylammonium o-methylbenzyldithiocarbamate.

(B) 6,7 - dihydro - 3 - [N-(o-methylbenzyl)thiocarbamoylthiomethyl]-5H - imidazo[2,1-b]thiazolium chloride.—To a solution of 41 parts of 1,3-dichloro-2-propanone in 400 parts of methanol is slowly added, with stirring, 96 parts of triethylammonium o-methylbenzyldithiocarbamate, followed in ½ hour by 33 parts of 2-imidazolidinethione. The resultant mixture is warmed until solution occurs, whereupon it is concentrated to ½ volume by distillation. From the concentrate, on chilling, 6,7-dihydro-3-[N - (o-methylbenzyl)thiocarbamoylthiomethyl]-5H-imidazo[2,1-b]thiazolium chloride precipitates. The product is isolated by filtration and dried in air. It has the formula

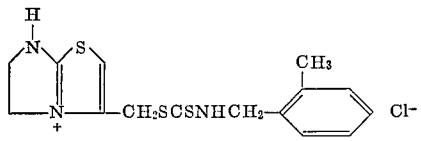

EXAMPLE 7

(A) Triethylammonium p-methylbenzyldithiocarbamate.—Substitution of 121 parts of p-methylbenzylamine for the 3-phenylpropylamine called for in Example 2A affords, by the procedure there detailed, triethylammonium p-methylbenzyldithiocarbamate melting at 115–118° (dec.).

(B) 6,7 - dihydro-3-[N-(p-methylbenzyl)thiocarbamoylthiomethyl]-5H - imidazo[2,1-b]thiazolium chloride.—Substitution of 96 parts of triethylammonium p-methylbenzyldithiocarbamate for the triethylammonium o-methylbenzyldithiocarbamate called for in Example 6B affords, by the precedure there detailed, 6,7-dihydro-3-[N-(p-methylbenzyl)thiocarbamoylthiomethyl]-5H - imidazo[2,1-b]thiazolium chloride which, recrystallized from a mixture of methanol and 2-propanol, melts at 217-221°. The product has the formula

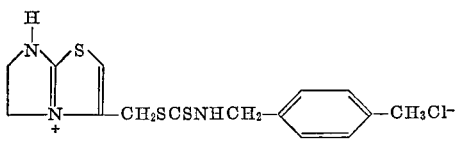

EXAMPLE 8

(A) Triethylammonium p-isopropylbenzyldithiocarbamate.—Substitution of 149 parts of p-isopropylbenzylamine for the 3-phenylpropylamine called for in Example 2A affords, by the procedure there detailed, triethylammonium p-isopropylbenzyldithiocarbamate melting at 77–83°.

(B) 6,7-dihydro-3 - [N-(p-isopropylbenzyl)thiocarbamoylthiomethyl] - 5H - imidazo[2,1 - b]thiazolium chloride.—Approximately 103 parts of triethylammonium p-isopropylbenzyldithiocarbamate is slowly stirred into a solution of 41 parts of 1,3-dichloro-2-propanone in 400 parts of 2-propanol. After ½ hour, 3 parts of 2-imidazolidinethione is added. The resultant mixture is stirred and heated until solution occurs, whereupon it is concentrated by distillation until precipitation of triethylamine hydrochloride is imminent. When this precipitation is complete, the mixture is filtered; and the filtrate is stripped of solvent by vacuum distillation. The residue is crystallized from a mixture of methanol and 2-propanol. The product thus isolated is 6,7-dihydro-3-[N-(p-isopropylbenzyl)thiocarbamoylthiomethyl] - 5H - imidazo[2,1-b]thiazolium chloride melting at 180–183.5°. It has the formula

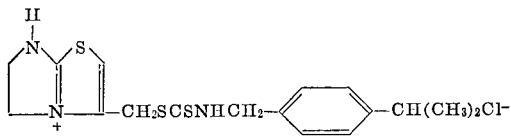

EXAMPLE 9

(A) Triethylammonium 2,4 - dimethylbenzyldithiocarbamate.—Substitution of 135 parts of 2,4-dimethylbenzylamine for the 3-phenylpropylamine called for in Example 2A affords, by the procedure there detailed, triethylammonium 2,4-dimethylbenzyldithiocarbamate.

(B) 6,7-dihydro-3-[N-(2,4-dimethylbenzyl)thiocarbamoylthiomethyl] - 5H - imidazo[2,1 - b]thiazolium chloride.—Substitution of 100 parts of triethylammonium 2,4-dimethylbenzyldithiocarbamate for the triethylammonium o-methylbenzyldithiocarbamate called for in Example 6B affords, by the procedure there detailed, 6,7-dihydro-3-[N-(2,4 - dimethylbenzyl)thiocarbamoylthiomethyl]-5H-imidazo[2,1-b]thiazolium chloride, having the formula

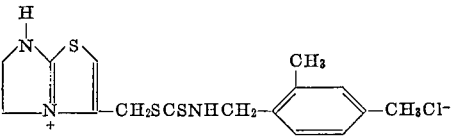

EXAMPLE 10

(A) Triethylammonium o-bromobenzyldithiocarbamate.—Substitution of 186 parts of o-bromobenzylamine for the 3-phenylpropylamine called for in Example 2A affords, by the procedure there detailed, triethylammonium o-bromobenzyldithiocarbamate.

(B) 3 - [N-(o-bromobenzyl)thiocarbamoylthiomethyl]-6,7-dihydro-5H-imidazo[2,1-b]thiazolium chloride.—Substitution of 108 parts of triethylammonium o-bromobenzyldithiocarbamate for the triethylammonium o-methylbenzyldithiocarbamate called for in Example 7B affords, by the procedure there detailed, 3-[N-(o-bromobenzyl)thiocarbamoylthiomethyl] - 6,7-dihydro-5H-imidazo[2,1-b]thiazolium chloride, having the formula

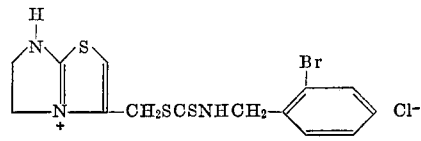

EXAMPLE 11

3 - [N-(3,4-dichlorobenzyl)thiocarbamoylthiomethyl]-6,7-dihydro-5H-imidazo[2,1-b]thiazolium chloride.—To a solution of 64 parts of 1,3-dichloro-2-propanone in 400 parts of methanol is slowly added, with agitation, 177 parts of triethylammonium 3,4-dichlorobenzyldithiocarbamate. The resultant mixture is allowed to stand for several hours, whereupon 51 parts of 2-imidazolidinethione is introduced. The mixture thus obtained is heated until solution occurs. The bulk of the solvent is removed by distillation, and sufficient acetone is then added to induce precipitation. The precipitate is filtered off and recrystallized from a mixture of methanol and chloroform to give 3 - [N - (3,4-dichlorobenzyl)thiocarbamoylthiomethyl]-6,7-dihydro-5H-imidazo[2,1 - b]thiazolium chloride melting at 214–217° (dec.). The product has the formula

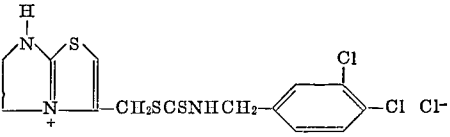

EXAMPLE 12

(A) Triethylammonium o - ethoxybenzyldithiocarbamate.—Substitution of 151 parts of o-ethoxybenzylamine for the 3-phenylpropylamine called for in Example 2A affords, by the procedure there detailed, triethylammonium o-ethoxybenzyldithiocarbamate.

(B) 3 - [N-(o-ethoxybenzyl)thiocarbamoylthiomethyl]-6,7-dihydro-5H-imidazo[2,1-b]thiazolium chloride.—To a solution of 48 parts of 1,3-dichloro-2-propanone in 400 parts of methanol is slowly added 123 parts of triethylammonium o-ethoxybenzyldithiocarbamate, followed ½ hour later by 38 parts of 2-imidazolidinethione. Solvent is thereupon removed by distillation, and the residue is crystallized from a mixture of 2-propanol and 2-butanone to give 3-[N-(o-ethoxybenzyl)thiocarbamoylthiomethyl]-6,7-dihydro-5H-imidazo[2,1-b]thiazolium chloride, having the formula

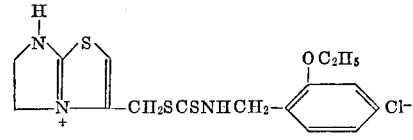

EXAMPLE 13

(A) Triethylammonium 3,4-dimethoxybenzyldithiocarbamate.—Substitution of 167 parts of 3,4-dimethoxybenzylamine for the 3-phenylpropylamine called for in Example 2A affords, by the procedure there detailed, triethylammonium 3,4 - dimethoxybenzyldithiocarbamate melting at 123–126° (dec.).

(B) 6,7 - dihydro-3-[N-(3,4-dimethoxybenzyl)thiocarbamoylthiomethyl] - 5H - imidazo[2,1-b]thiazolium chloride.—To a solution of 48 parts of 1,3-dichloro-2-propanone in 400 parts of methanol is slowly added 129 parts of triethylammonium 3,4-dimethoxybenzyldithiocarbamate. Solution, followed by precipitation, occurs. The precipitate is filtered out. To the filtrate is added 38 parts of 2-imidazolidinethione. The resultant mixture is freed of solvent by distillation, and the residue is slurried with approximately 400 parts of 2-propanol. The slurry is filtered, and the filtrate is diluted with ½ volume of 2-butanone. The precipitate thrown down is filtered off and recrystallized from a mixture of methanol and 2-propanol to give 6,7-dihydro-3-[N-(3,4-dimethoxybenzyl)thiocarbamoylthiomethyl] - 5H - imidazo[2,1-b]thiazolium chloride melting at 181–183°. The product has the formula

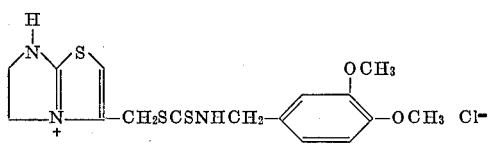

EXAMPLE 14

(A) Triethylammonium furfuryldithiocarbamate.—Substitution of 97 parts of furfurylamine for the 3-phenylpropylamine called for in Example 2A affords, by the procedure there detailed, triethylammonium furfuryldithiocarbamate melting at 106–109°.

(B) 3-(N-furfurylthiocarbamoylthiomethyl) - 6,7 - dihydro-5H-imidazo[2,1-b]thiazolium chloride.—To a solution of 64 parts of 1,3-dichloro-2-propanone in 400 parts of 2-propanol is slowly added, with stirring, 137 parts of triethylammonium furfuryldithiocarbamate. Stirring is continued for ½ hour, whereupon 51 parts of 2-imidazolidinethione is introduced and the resultant mixture heated at around 90°. Solution occurs. Upon cooling the solution and allowing it to stand for several hours, a precipitate is thrown down which, filtered off and crystallized from methanol, affords 3-(N-furfurylthiocarbamoylthiomethyl)-6,7-dihydro-5H-imidazo[2,1-b]-thiazolium chloride melting at approximately 192–193° (dec.). The product has the formula

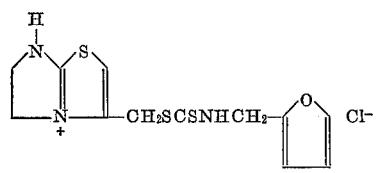

EXAMPLE 15

3 - (N - benzylthiocarbamoylthiomethyl) - 7H - imidazo[2,1-b]thiazolium chloride.—Approximately 143 parts of triethylammonium benzyldithiocarbamate is slowly stirred into a solution of 64 parts of 1,3-dichloro-2-propanone in 400 parts of 2-propanol. Stirring is continued for ½ hour, whereupon 50 parts of imidazole-2-thiol is introduced. The resultant mixture is heated at approximately 85° for several hours while solution occurs. Upon cooling, a precipitate forms which, filtered off and recrystallized from a mixture of methanol and 2-propanol, melts at approximately 218–219°. The product thus isolated is 3-(N-benzylthiocarbamoylthiomethyl)-7H-imidazo[2,1-b]thiazolium chloride, having the formula

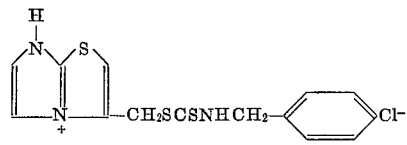

EXAMPLE 16

3 - (N - furfurylthiocarbamoylthiomethyl) - 7H - imidazo[2,1-b]thiazolium chloride.—To a solution of 34 parts of 1,3-dichloro-2-propanone in 200 parts of 2-propanol is slowly added, with agitation, 72 parts of triethylammonium furfuryldithiocarbamate. Approximately ½ hour later, 27 parts of imidazole-2-thiol is introduced. The resultant mixture is heated at 85–90° while solution occurs and for several hours thereafter. Precipitation, furthered by chilling, eventuates. The precipitate is filtered off and recrystallized from a mixture of methanol and 2-propanol to give 3-(N-furfurylthiocarbamoylthiomethyl)-7H-imidazo[2,1-b]thiazolium chloride melting at approximately 199.5–200° (dec.). The product has the formula

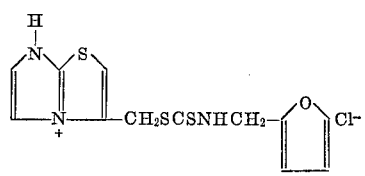

What is claimed is:
1. A compound of the formula

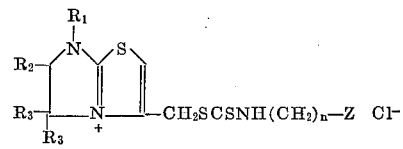

wherein $R_1$ represents hydrogen or lower alkyl, $R_2$ and $R_3$ each represent hydrogen or methyl except when $R_2$ and $R_3$, taken together, represent $\Delta^5$ unsaturation, in which circumstance the remaining $R_3$ represents solely hydrogen, $n$ represents a positive integer less than 4, and Z represents 2-furyl or a radical of the formula

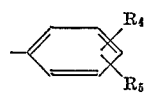

wherein $R_4$ represents hydrogen, lower alkyl, chlorine, bromine, or lower alkoxy and $R_5$ represents hydrogen or a substituent identical with that represented by $R_4$.

2. A compound according to claim 1 having the formula

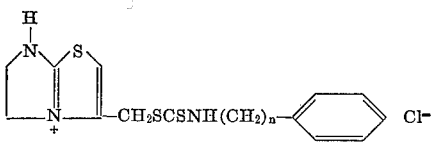

wherein $n$ represents a positive integer less than 4.

3. A compound according to claim 1 which is 3-(N-benzylthiocarbamoylthiomethyl) - 6,7 - dihydro - 5H - imidazo[2,1-b]thiazolium chloride.

4. A compound according to claim 1 having the formula

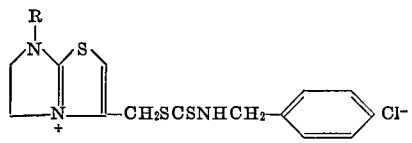

wherein R represents lower alkyl.

5. A compound according to claim 1 which is 6,7-dihydro - 3 - [N - (p - isopropylbenzyl)thiocarbamoylthiomethyl]-5H-imidazo[2,1-b]thiazolium chloride.

6. A compound according to claim 1 having the formula

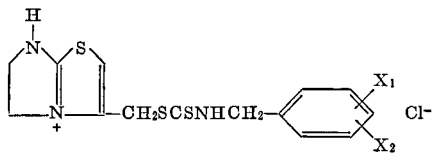

wherein $X_1$ represents hydrogen, chlorine, bromine, or methoxy and $X_2$ represents hydrogen or a substituent identical with that represented by $X_1$.

7. A compound according to claim 1 which is 3-[N-(3,4 - dichlorobenzyl)thiocarbamoylthiomethyl] - 6,7-dihydro-5H-imidazo[2,1-b]thiazolium chloride.

8. A compound according to claim 1 having the formula

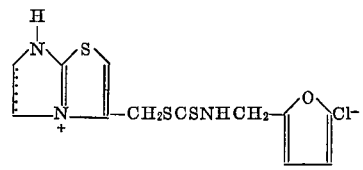

wherein the dotted line represents optional $\Delta^5$ unsaturation.

9. A compound according to claim 1 which is 3-(N-furfurylthiocarbamoylthiomethyl) - 7H - imidazo[2,1-b]thiazolium chloride.

10. A compound according to claim 1 which is 3-(N-benzylthiocarbamoylthiomethyl) - 7H - imidazo[2,1-b] - thiazolium chloride.

References Cited

UNITED STATES PATENTS 3,201,409   8/1965   Spivack et al. _____ 260—306.8

ALEX MAZEL, Primary Examiner

R. J. GALLAGHER, Assistant Examiner

U.S. Cl. X.R.

71—90; 260—309, 309.7, 455; 424—270

UNITED STATES PATENT OFFICE
CERTIFICATE OF CORRECTION

Patent No. 3,542,802    Dated November 24, 1970

Inventor(s) Robert C. Tweit

It is certified that error appears in the above-identified patent and that said Letters Patent are hereby corrected as shown below:

Column 4, line 46, omit "the formul"

Column 4, line 50, line above was omitted, "-amine" should be --wherein Z and Alk are defined as before, with triethylamine --.

Column 5, line 25, "distill and" should be --distilland--

Column 5, line 45, "restulant" should be --resultant--.

Column 6, first formula

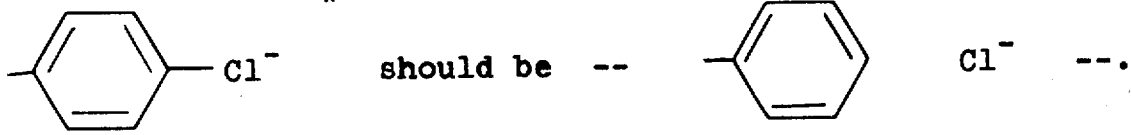

Column 7, line 21 "precedure" should be --procedure--.

Column 7, second formula,

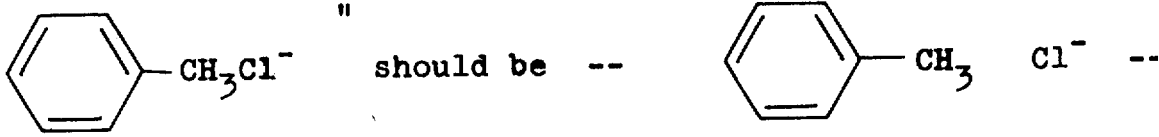

Column 7, line 45, " 3 parts " should be -- 33 parts --.

Column 7, third formula,

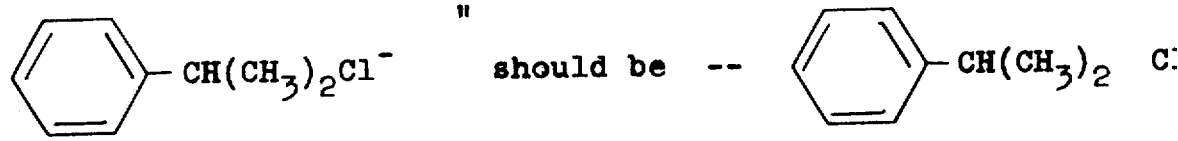

PO-1050
(5/69)

UNITED STATES PATENT OFFICE
CERTIFICATE OF CORRECTION

Patent No. 3,542,802     Dated November 24, 1970

Inventor(s) Robert C. Tweit

It is certified that error appears in the above-identified patent and that said Letters Patent are hereby corrected as shown below:

Column 8, first formula

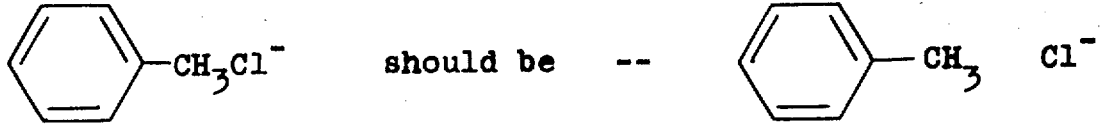

Column 10, first formula

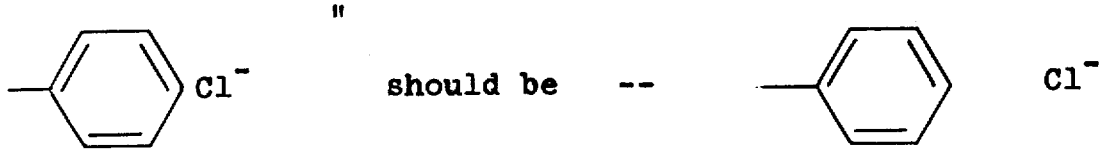

Column 12, first formula

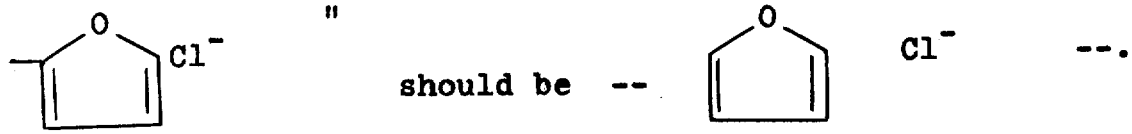

Signed and sealed this 13th day of July 1971.

(SEAL)
Attest:

EDWARD M. FLETCHER, JR.       WILLIAM E. SCHUYLER, JR.
Attesting Officer               Commissioner of Patents